United States Patent Office 3,409,402
Patented Nov. 5, 1968

3,409,402
STABILIZATION OF CUBIC SILICON CARBIDE
Arrigo Addamiano, Willoughby, Ohio, assignor to General Electric Company, a corporation of New York
No Drawing. Continuation-in-part of application Ser. No. 376,271, June 18, 1964. This application May 5, 1967, Ser. No. 636,287
2 Claims. (Cl. 23—208)

ABSTRACT OF THE DISCLOSURE

Stabilization of cubic beta silicon carbide, the low resistivity form, above the normal cubic to hexagonal transition temperature is achieved by saturating the material with nitrogen and thereafter maintaining an atmosphere of nitrogen about the material.

---

This application is a continuation-in-part of my co-pending application Serial No. 376,271 filed June 18, 1964, entitled Stabilized Cubic Silicon Carbide, similarly assigned, and now abandoned.

This invention relates to the stabilization of cubic silicon carbide in order to control its physical and electrical properties, and to the production and use of the material.

Silicon carbide is a substance of great practical importance which, besides use as an abrasive, finds applications as a semiconductor, a voltage dependent resistor, a refractory material and in the fabrication of heating elements for high temperature furnaces, sometimes known as "hot rods." In electrical applications particularly, the physical properties of the material, be it in a single crystal form or in powder form, must be accurately controlled and reproducible. Moreover, in order to extend the field of applications, the material must be in a stable form and must not be markedly affected by changes in environment, such as temperature, pressure, etc. This is particularly desirable in use of SiC as heating elements at higher temperatures.

As reported by H. N. Baumann, Jr., in Journal of Electrochemical Society, 99, 109–114 (1952), silicon carbide is stable in the cubic or beta-SiC form to near 2100° C., but changes monotropically, i.e., irreversibly to hexagonal or alpha-SiC above that temperature, the transformation being complete after a few minutes at 2300° C. The transformation from cubic to hexagonal is accompanied by a great increase in resistivity of the material which may make it unsuitable for further use in a particular application. Numerous crystal structure studies have shown that at temperatures above approximately 2200°–2300° C. silicon carbide can form a large number of polymorphic modifications usually referred to as polytypes, which have widely differing properties. A recent paper by W. F. Knippenberg (Philips Research Reports 18, No. 3, 161–174, 1963) lists 44 different polytypes and a few more were discovered quite recently.

For heating elements or hot rods, it is the cubic beta-SiC form which is used because its low resistance makes it suitable at the voltages commonly available. Continuous use in air has been limited to about 1600° C. on account of oxidation of the material. However even when air is excluded, conversion from cubic to hexagonal form sets in at temperatures above 2100° C. and the transformation is substantially complete at 2300° C. The great increase in resistivity which accompanies the transformation ends the utility of the element.

The object of the invention is to achieve the use of the low resistivity form of silicon carbide, that is cubic or β-SiC, at higher temperatures than heretofore possible without conversion to the high resistivity or hexagonal α-SiC form.

The foregoing entails the preparation of SiC in a stable crystal form having a low resistivity and which does not undergo phase transformation up to temperatures close to the dissociation temperature of SiC, namely 2830° C. Silicon carbide in such form is eminently suitable for the manufacture of heating elements or hot rods.

The invention is predicated upon my discovery that silicon carbide may be maintained in the cubic form above normal beta to alpha transition temperature and substantially up to its dissociation temperature of 2830° C. by maintaining it saturated with nitrogen. This may be done by first heating cubic SiC in nitrogen at temperatures below the transition point. Preferably the quantity of nitrogen dissolved in the material should be close to the solubility limit. As a practical matter, the desired result is preferably achieved by preparing the material in an atmosphere of nitrogen. Thus by reacting very pure silicon or silica or a material heat-degradable to either and pure graphite in the presence of an atmosphere of nitrogen, the product obtained is cubic SiC containing the required nitrogen. A minimum temperature of about 1500° C. is required for the reaction to take place and the cubic form of SiC will be produced up to the dissociation temperature of SiC at 2830° C. Such cubic nitrogen-containing β-SiC may then be used up to the dissociation temperature and will remain in the cubic form provided it is operated in an atmosphere of pure nitrogen at 500 torr or more. A nitrogen-containing but otherwise inert atmosphere, such as nitrogen plus an inert gas such as argon, with at least 500 torr of $N_2$ in the mixture, may also be used.

Considering only the hexagonal and cubic polytypes or forms of silicon carbide, the color and crystal shape variations are given in the following table:

SILICON CARBIDE

| Form | | Color | | | Shape |
|---|---|---|---|---|---|
| | Pure | n Type Donor: $N_2$ | | p Type Acceptor: Al, B | |
| Hexagonal 6H | Clear and transparent | Green | | Black or Dark Blue | Flat plates hexagonal contour. |
| Cubic | Yellow | Dark green to black with increasing concentration. | | Gray to black with increasing concentration. | Rod-like, whiskers, odd shapes. |

Material suitable for the invention is the nitrogen containing cubic beta-SiC, dark green to black. Examples 1 and 2 to follow illustrate the preparation and use of such material.

Example 1. A fine powder of $SiO_2$ (commercially known as Cab-O-Sil) and graphite are blended together using the proportions by weight demanded by the reaction equation $3C+SiO_2=2CO+SiC$. The mixture is transferred to a graphite crucible and fired in an atmosphere of pure $N_2$ under a gauge pressure of 45 pounds per square inch for half an hour at 2625° C. After quenching the mass one separates the cubic SiC free from other modifications in the form of a coarse powder of dark color and low resistivity. This powder was then maintained at a temperature of 2700° C. in nitrogen at atmospheric pressure for several days and did not undergo any phase transformation as shown by X-ray powder patterns, or resistance change.

Example 2. A mixture of semiconductor grade silicon and graphite, weighed in the proportions corresponding to the reaction equation Si+C=SiC, was fired in an atmosphere of pure nitrogen for one hour at 2490° C. in a carbon tube furnace. The nitrogen pressure was slightly above one atmosphere at room temperature, and rose to 18 p.s.i.g. at operating temperature (the furnace being closed). The SiC obtained was a dark green material consisting of 100% cubic crystals.

By contrast with the foregoing, a mixture of C+Si as above was set in a graphite crucible in a carbon tube furnace, the furnace was exhausted, then filled with 100 torr of $N_2$ plus 760 torr of pure argon. After one hour firing at about 2500° C. (total pressure increased to 18 p.s.i.g. during firing) the material was quenched and analyzed by X-ray diffraction. The effective pressure of nitrogen during firing was only about 200 torr. The green powder obtained was not entirely cubic SiC, but contained minor amounts of other polytypes, particularly 6H-SiC.

As is evident from the examples, the transformation of the cubic (or low temperature) form of SiC into alpha-SiC (the high temperature form) is suppressed in the presence of nitrogen. An atmosphere of nitrogen is sufficient to stabilize cubic SiC to temperatures well in excess of the normal transformation point from cubic to hexagonal SiC. It is therefore possible to obtain and operate devices formed of cubic SiC, without phase changes occurring, up to at least 2625° C. if an atmosphere of pure $N_2$ is present, as shown by Example 1, and in fact substantially up to the dissociation temperature of SiC at 2830° C. Different ways exist by which to produce the desired pressure of nitrogen. For instance, silicon nitride can be added alongside silicon or as replacement for part of the silicon. Alternatively, nitrogen can be supplied by materials thermally dissociable at the operating temperature to provide nitrogen, for instance by the thermal dissociation of boron nitride, BN, or other convenient nitrides, located in a suitable part of the furnace.

In making cubic silicon carbide for use in accordance with the invention, the firing times can be changed to produce materials with different particle size. Short firing times favor small particle size. Long firing times favor large particle size and the attainment of almost theoretical densities in the crystallites produced.

While it is to be expected that other materials, for instance phosphorus, produce similar effects as $N_2$, impurities in the reacting materials may produce adverse effects. Therefore control of the composition of the starting materials, crucible, etc. should always be maintained. In the examples above, the graphite and graphite crucibles were of spectrographic grade and contained less than six parts per million of metallic impurities. The silicon was "semiconductor grade" and the silica (Cab-O-Sil of Cabot Corporation) container only traces of Na, Ca and Al, each of them in concentrations below 100 parts per million.

What I claim as new and desire to secure by Letters Patent of the United States is:

1. The method of stabilizing cubic beta silicon carbide above the beta to alpha transition temperature which comprises making cubic beta SiC saturated with nitrogen by reacting carbon and silicon, silica or substances heat-degradable thereto, in an atmosphere of nitrogen at a pressure not less than about 500 torr, and at a temperature above 1500° C. and below 2830° C., and thereafter maintaining a nitrogen atmosphere at a pressure of at least about 500 torr about the material when its temperature exceeds the transition temperature.

2. The method of claim 1 wherein the nitrogen pressure during reaction of carbon and silicon is at least one atmosphere, and thereafter a nitrogen pressure of at least one atmosphere is maintained about the material when its temperature exceeds the transition temperature.

References Cited

UNITED STATES PATENTS 3,161,473  12/1964  Pultz _____ 23—208

FOREIGN PATENTS 545,408  8/1957  Canada.

OSCAR R. VERTIZ, *Primary Examiner.*

G. T. OZAKI, *Assistant Examiner.*